(12) United States Patent
Inayoshi et al.

(10) Patent No.: US 7,864,727 B2
(45) Date of Patent: Jan. 4, 2011

(54) CONGESTION CONTROL METHOD FOR WIRELESS COMMUNICATION SYSTEM AND BASE STATION CONTROL APPARATUS

(75) Inventors: Hirokazu Inayoshi, Yokohama (JP); Tomoyasu Sakaguchi, Fujisawa (JP); Masaaki Yano, Yokohama (JP); Daiho Kasai, Fujisawa (JP); Takanori Moritomo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 872 days.

(21) Appl. No.: 11/763,504

(22) Filed: Jun. 15, 2007

(65) Prior Publication Data
US 2007/0293235 A1    Dec. 20, 2007

(30) Foreign Application Priority Data
Jun. 16, 2006 (JP) ............................. 2006-167069

(51) Int. Cl.
*H04W 4/00* (2009.01)
(52) U.S. Cl. ........................................ 370/329; 370/331
(58) Field of Classification Search .................. 370/329, 370/330, 331
See application file for complete search history.

(56) References Cited

U.S. PATENT DOCUMENTS

| | | | | |
|---|---|---|---|---|
| 2005/0026619 | A1* | 2/2005 | Jha | 455/441 |
| 2007/0037581 | A1* | 2/2007 | Morita | 455/453 |
| 2009/0005049 | A1* | 1/2009 | Nishio et al. | 455/442 |

FOREIGN PATENT DOCUMENTS

| | | |
|---|---|---|
| JP | 06-069860 | 3/1994 |
| JP | 2002-077042 | 3/2002 |
| JP | 2002-247630 | 8/2002 |

OTHER PUBLICATIONS $3^{RD}$ Generation Partnership Project 2 "3GPP2" cdma2000 High Rate Packet Data Air Interface Specification; 3GPP2 C. S0024; Version 4.0; Oct. 25, 2002; pp. 1-1-1-19.

(Continued)

*Primary Examiner*—Ajit Patel
*Assistant Examiner*—Michael Irace
(74) *Attorney, Agent, or Firm*—Antonelli, Terry, Stout & Kraus, LLP.

(57) ABSTRACT

If a wireless resource congestion occurs, the wireless resources of the entire system are used efficiently to reduce a disconnection of communication with a congested sector and a state in which a new call cannot be originated nor terminated. A base station control apparatus compares the wireless resource usage amount of each sector of each base station with values stored in a wireless resource threshold table. If a sector of a base station is in the light congestion state, the neighbor search window size of a sector specifying the congested sector as a neighbor is changed to restrict a soft hand-over to the congested sector. If a sector of a base station is in the heavy congestion state, a mobile station which is communicating in the congested sector and receiving radio waves of another sector with stability is subjected to a forced soft hand-over.

10 Claims, 12 Drawing Sheets

OTHER PUBLICATIONS $3^{RD}$ Generation Partnership Project 2 "3GPP2" cdma2000 High Rate Packet Data Air Interface Specification; 3GPP2 C. S0024; Version 4.0; Oct. 25, 2002; pp. 6-1-6-40.

$3^{RD}$ Generation Partnership Project 2 "3GPP2" cdma2000 High Rate Packet Data Air Interface Specification; 3GPP2 C. S0024; Version 4.0; Oct. 25, 2002; pp. 6-54-6-87.

$3^{RD}$ Generation Partnership Project 2 "3GPP2" cdma2000 High Rate Packet Data Air Interface Specification; 3GPP2 C. S0024; Version 4.0; Oct. 25, 2002; pp. 6-105-6-115.

$3^{RD}$ Generation Partnership Project 2 "3GPP2" cdma2000 High Rate Packet Data Air Interface Specification; 3GPP2 C. S0024-A; Version 2; Jul. 2005; pp. 8-87-8-88 and pp. 8-159-8-169.

* cited by examiner

SECTOR DATABASE 104

(BASE STATION CONTROL APPARATUS
10 MANAGES ONE SECTOR DATABASE.)

| SECTOR NO. | BASE STATION NAME | SECTOR | PILOT OFFSET | FREQUENCY CHANNEL |
|---|---|---|---|---|
| 1 | BASE STATION 20-1 | SECTOR 1 | A | aaa |
| 2 | BASE STATION 20-1 | SECTOR 2 | B | bbb |
| 3 | BASE STATION 20-1 | SECTOR 3 | C | ccc |
| 4 | BASE STATION 20-2 | SECTOR 1 | D | ddd |
| 5 | BASE STATION 20-2 | SECTOR 2 | E | eee |
| 6 | BASE STATION 20-2 | SECTOR 3 | F | fff |
| 7 | BASE STATION 20-3 | SECTOR 1 | G | ggg |
| 8 | BASE STATION 20-3 | SECTOR 2 | H | hhh |
| 9 | BASE STATION 20-3 | SECTOR 3 | I | iiii |
| ... | ... | ... | ... | ... |

FIG. 6

NEIGHBOR LIST DATABASE 105

(LIST OF ADJACENT BASE STATIONS OR SECTORS)
(MANAGED ON SECTOR BASIS)

INITIAL STATE (WITHOUT CONGESTED BASE STATION)

| No. | SECTOR NO. OF NEIGHBOR SECTOR | NEIGHBOR SEARCH WINDOW SIZE | LIGHT CONGESTION CONTROL STATE |
|---|---|---|---|
| 1 | 2 | 100 CHIPS | - |
| 2 | 3 | 100 CHIPS | - |
| 3 | 4 | 100 CHIPS | - |
| 4 | 5 | 100 CHIPS | - |
| 5 | 6 | 100 CHIPS | - |
| ... | ... | ... | ... |

*THIS TABLE INDICATES EXAMPLE NEIGHBOR LIST OF SECTOR NO. 1.

FIG. 7

WIRELESS RESOURCE USAGE AMOUNT DATABASE 106

(BASE STATION CONTROL APPARATUS 10 MANAGES
ONE WIRELESS RESOURCE USAGE AMOUNT DATABASE.)

INITIAL STATE (WITHOUT CONGESTED BASE STATION)

| SECTOR NO. | WIRELESS RESOURCE USAGE AMOUNT | CONGESTION STATE |
|---|---|---|
| 1 | 10 CALLS | - |
| 2 | 15 CALLS | - |
| 3 | 10 CALLS | - |
| 4 | 8 CALLS | - |
| 5 | 25 CALLS | - |
| 6 | 10 CALLS | - |
| 7 | 15 CALLS | - |
| 8 | 10 CALLS | - |
| 9 | 8 CALLS | - |
| ... | ... | ... |

FIG. 8

RADIO WAVE CAPTURE STATE DATABASE 107

(MANAGED ON SECTOR BASIS)

| TIME | MOBILE STATION 30-1 SECTOR NO. | MOBILE STATION 30-2 SECTOR NO. | MOBILE STATION 30-4 SECTOR NO. | |
|---|---|---|---|---|
| 13:00 | 1, | — | 1, | |
| 13:01 | 1, | — | 1, 2 | |
| 13:02 | 1, 2 | — | 1, 2 | ... |
| 13:03 | 1, 2 | 1 | 1, 2 | |
| 13:04 | 1, 2, 3 | 1 | 1, 2, 3 | (DATA OF ALL MOBILE STATIONS IS MANAGED.) |
| 13:05 | 1, 2, 3 | 1 | 1, 2, 3 | |
| 13:06 | 1, 2, 3 | 1, 2 | 1, | |
| 13:07 | 1, 2, 3 | 1, 2 | 1, 2 | |
| 13:08 | 1, 2, 3 | 1 | 1, | |
| ... | ... | ... | ... | |

*THIS TABLE INDICATES EXAMPLE RADIO WAVE CAPTURE STATES OF SECTOR NO. 1.

FIG. 9

NEIGHBOR LIST DATABASE 105

(LIST OF ADJACENT BASE STATIONS OR SECTORS)
(MANAGED ON SECTOR BASIS)

CONGESTION CONTROL STATE

| No. | SECTOR NO. OF NEIGHBOR SECTOR | NEIGHBOR SEARCH WINDOW SIZE | LIGHT CONGESTION CONTROL STATE |
|---|---|---|---|
| 1 | 2 | 100 CHIPS | - |
| 2 | 3 | 4 CHIPS | CONTROLLING |
| 3 | 4 | 100 CHIPS | - |
| 4 | 5 | 4 CHIPS | CONTROLLING |
| 5 | 6 | 100 CHIPS | - |
| ... | ... | ... | ... |

*THIS TABLE INDICATES EXAMPLE NEIGHBOR LIST OF SECTOR NO. 1.

FIG. 10

WIRELESS RESOURCE USAGE AMOUNT DATABASE 106

(BASE STATION CONTROL APPARATUS 10 MANAGES
ONE WIRELESS RESOURCE USAGE AMOUNT DATABASE.)

CONGESTION CONTROL STATE

| SECTOR NO. | WIRELESS RESOURCE USAGE AMOUNT | CONGESTION STATE |
|---|---|---|
| 1 | 10 CALLS | - |
| 2 | 15 CALLS | - |
| 3 | 50 CALLS | HEAVY |
| 4 | 8 CALLS | - |
| 5 | 35 CALLS | LIGHT |
| 6 | 10 CALLS | - |
| 7 | 15 CALLS | - |
| 8 | 50 CALLS | - |
| 9 | 8 CALLS | - |
| ... | ... | ... |

FIG. 11

SEARCH WINDOW SIZE

| SEARCH WINDOW SIZE VALUE | SEARCH WINDOW SIZE (PN CHIPS) |
|---|---|
| 0 | 4 |
| 1 | 6 |
| 2 | 8 |
| 3 | 10 |
| 4 | 14 |
| 5 | 20 |
| 6 | 28 |
| 7 | 40 |
| 8 | 60 |
| 9 | 80 |
| 10 | 100 |
| 11 | 130 |
| 12 | 160 |
| 13 | 226 |
| 14 | 320 |
| 15 | 452 |

FIG. 12

CONGESTION CONTROL METHOD FOR WIRELESS COMMUNICATION SYSTEM AND BASE STATION CONTROL APPARATUS

BACKGROUND OF THE INVENTION

1. Field of the Invention

The present invention relates to a congestion control method for a wireless communication system and a base station control apparatus, and more specifically, to a congestion control method for a wireless communication system and a base station control apparatus for performing congestion control in a mobile communication system where a plurality of mobile stations can simultaneously perform communication in a single sector, a single mobile station can receive signals from a plurality of sectors, and a code division multiple access (CDMA) communication is performed in each sector.

2. Description of the Related Art

The basis of mobile communication is that a mobile station such as an in-vehicle phone or a portable phone captures radio waves from a sector of a nearby base station and exchanges radio waves with the base station. A serviceable range or the reach of radio waves from one of antennas mounted on the base station is referred to as "a sector". The base station has one or more sectors. A mobile communication service area is formed by providing sectors without leaving a space. With a multi-sector structure formed by providing base stations at regular spacings, a plurality of sectors of the base stations provided closely (not sparsely) establishes a wide service area, allowing a wireless terminal to communicate from any place.

A single sector has finite wireless communication resources (connections) that can be used simultaneously by a plurality of mobile stations. In a CDMA mobile communication system, code patterns that can be used to start communication are used in descending order of intensities of radio waves, and an identical wireless channel is used as far as the intensities of radio waves allows the call to be continued. If the intensities of received radio waves decreases because of a movement of the mobile station or a change in the environment, a soft hand-over to radio waves of another sector occurs while the communication state is being maintained.

If many mobile stations attempt to start unplanned communication newly in an identical sector because of an accident or an event, the wireless resources are congested to disable communication. Some methods have been developed as techniques to handle the problem of congestions in wireless resources caused by a temporary increase in communication traffic. For example, the base station can restrict communication with mobile stations when the number of remaining resources such as transmitting and receiving apparatuses decreases. In a CDMA mobile communication system, when the amount of interference power increases, communication of the mobile station with the base station is restricted. The communication restriction includes the following: the mobile stations are classified into general mobile stations and priority mobile stations and are allowed to register their positions or not, to originate a call or not, and so on in stages, in accordance with the remaining resources and the amount of interference power, for instance. To make efficient use of wireless resources, the transmission power of a congested base station is decreased to force a soft hand-over of a mobile station to a nearby base station (refer to Japanese Unexamined Patent Application Publications No. Hei-6-69860 and No. 2002-77042).

SUMMARY OF THE INVENTION

A conventional system, in which communication is restricted in the event of congestion, would decrease the utilization efficiency of the system and the convenience of the user. In addition, it is not easy to determine appropriate values for communication restrictions in accordance with the propagation environment when the system is actually operated. If the transmission power is controlled, it would take time to stabilize power and would cause frequent soft hand-over between base stations or sectors.

Accordingly, it is an object of the present invention to provide a wireless resource congestion control method that can control congestion of wireless resources without decreasing the utilization efficiency of the system and without controlling power, by controlling a neighbor search window size (SectorParameters broadcast message, which will be described later)(refer to 3GPP2 CS0024) of a sector specifying a congested sector as a neighbor in accordance with variations in the amount of wireless resource usage in the sector or by performing forced soft hand-over control.

When a mobile station in a CDMA mobile communication system changes the base station to communicate with, signals are combined or a channel is selected through communication with a plurality of base stations, to switch to the channel without an instantaneous interruption, which is known as a soft hand-over technology. A prerequisite to the soft hand-over is that the mobile station receives a control signal from a sector of an adjacent base station beforehand. The mobile station searches for radio waves of another sector by sequentially using offset values other than the pilot offset value used in the current communication sector and attempts to capture radio waves from the other sector, so that a soft hand-over can occur.

The base station manages the control information of sectors and broadcast the information periodically. This broadcast message (SectorParameters message) contains radio wave information of nearby sectors, which is referred to as a neighbor list (neighbor sector information).

The mobile station can capture radio waves of a neighbor sector efficiently on the basis of the neighbor list, and this will bring about an efficient soft hand-over. If the control information received from the current communication sector includes a neighbor list, the mobile station can capture radio waves from a neighbor sector efficiently by attempting to capture radio waves having the frequency and the pilot offset specified in the neighbor list within the range of the neighbor search window size specified in the neighbor list. The mobile station captures radio waves from a plurality of base stations, compare the quality of received waves, and hands off to waves with a higher quality.

The CDMA mobile communication system can make an efficient soft hand-over and provide a high-quality mobile communication service by determining a correct neighbor list for each sector, specifying and storing the information of the determined neighbor list as management information of the base station, and sending correct neighbor list information by a broadcast message.

Figure 12:
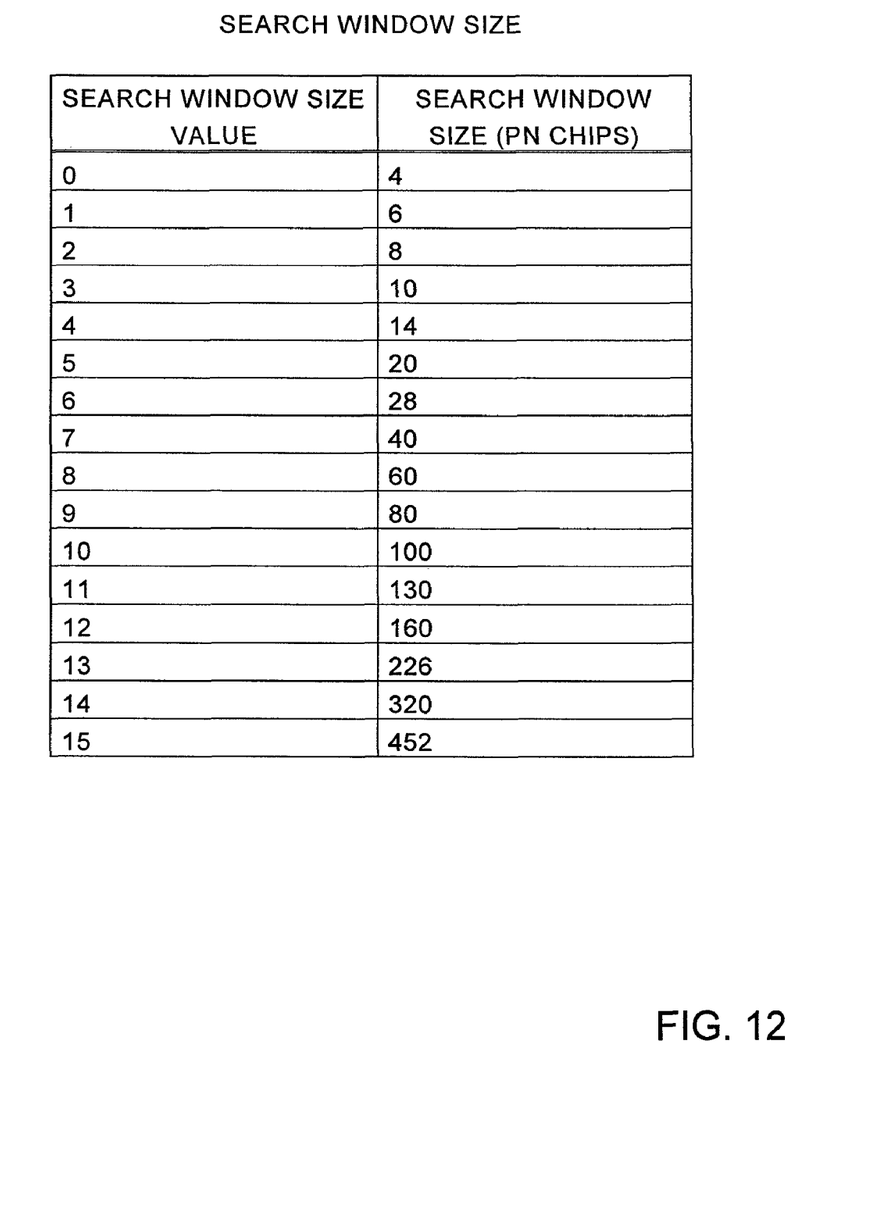
FIG. 12 is a view illustrating the relationship between a search window size and the number of chips.

The neighbor search window size is the size of an area in which the mobile station searches for a neighbor sector included in the neighbor list, and the size is determined as shown in FIG. 12, which will be described later (refer to 3GPP2 CS0024).

Increasing or decreasing the neighbor search window size is equivalent to increasing or decreasing the number of chips to be searched. Consequently, radio waves of a sector farther than the chips to be searched will not be captured.

According to the present invention, each sector has a threshold amount of wireless resource usage to be used as a criterion for a light congestion state and a threshold amount of wireless resource usage to be used as a criterion for a heavy congestion state, and respective restoration thresholds. If the sector enters the light congestion state, the neighbor search window size, which is a part of a broadcast message (Sector-Parameters message) and specifies a search area of the lightly congested sector, of a nearby sector specifying the lightly congested sector as a neighbor is controlled. This operation avoids any mobile station from making a soft hand-over to the lightly congested sector, preventing the amount of wireless resource usage from increasing to result in the heavy congestion state. In the light congestion state, a new connection to the lightly congested sector is not restricted, so that inconveniences such as trouble getting a connection from a mobile station can be removed.

If an increased number of mobile stations make a new connection, the sector may enter the heavy congestion state. If the sector is heavily congested, mobile stations that communicate in the sector and receive radio waves from another sector continuously are extracted and are subjected to a forced soft hand-over to a sector without congestion. The forced soft hand-over decreases the amount of wireless resource usage of the heavily congested sector, preventing the wireless resources from being congested. In the heavy congestion state, any new connection to the sector is not restricted, and inconveniences such as trouble getting a connection from a mobile station can be removed.

The mobile station subjected to the forced soft hand-over from the heavily congested sector to a nearby sector will not be subjected to another soft hand-over from the nearby sector to the former sector because the neighbor search window size for searching for the former sector from the nearby sector is controlled by light congestion control.

When the amount of wireless resource usage of the heavily congested sector becomes lower than the restoration threshold of the heavy congestion state, forced soft hand-over control is suppressed. When the amount of wireless resource usage of the lightly congested sector becomes lower than the restoration threshold of the light congestion state, the neighbor search window size is returned to the former size.

The mobile communication system performs such congestion control that the utilization efficiency of the system or the convenience of the user will not be impaired even if there is a congested sector because of the lack of wireless resources.

According to the first solving means of the present invention, there is provided a congestion control method for a wireless communication system having a plurality of base stations for performing code division multiple access (CDMA) wireless communication and a base station control apparatus for controlling the plurality of base stations, the congestion control method comprising the steps of:

the base station control apparatus determining whether a sector is in a light congestion state or a heavy congestion state in accordance with at least two different congestion levels, with reference to a wireless resource usage amount data base having stored a wireless resource usage amount for each sector, based on the wireless resource usage amount;

(1) if a sector is determined to be in the light congestion state, the base station control apparatus referencing a neighbor list database having stored, on a sector basis, a neighbor sector and a neighbor search window size indicating the size of an area or the number of chips by which a wireless terminal searches for the neighbor sector, and the wireless resource usage amount database;

extracting a sector which has specified the congested sector as a neighbor sector and is not congested itself; and reducing the neighbor search window size of the congested sector with respect to the data of the extracted sector in the neighbor list database to suppress a soft hand-over from the extracted sector to the congested sector; and (2) if a sector is determined to be in the heavy congestion state, the base station control apparatus referencing a radio wave capture state database having stored time-series data of a radio wave capture state of each wireless terminal on a sector basis and the wireless resource usage amount database;

extracting a wireless terminal which specifies the congested sector as a neighbor sector and keeps capturing radio waves of a plurality of sectors for a predetermined period of time or longer and sectors serving the wireless terminal; and selecting a sector having a relatively small wireless resource usage amount, from the extracted sectors, and causing forced soft hand-over of the wireless terminal to the selected sector.

According to the second solving means of the present invention, there is provided a base station control apparatus for controlling a plurality of base stations that perform code division multiple access (CDMA) wireless communication, the base station control apparatus comprising:

a wireless resource usage amount database which has stored a wireless resource usage amount for each sector;

a neighbor list database which has stored, on a sector basis, a neighbor sector and a neighbor search window size indicating the size of an area or the number of chips by which a wireless terminal searches for the neighbor sector;

a radio wave capture state database which has stored time-series data of a radio wave capture state of each wireless terminal on a sector basis; and a base station control block for determining a congested sector, changing the neighbor search window size, and determining a wireless terminal and/or a sector to be the target of a forced soft hand-over;

wherein the base station control block determines whether a sector is in the light or heavy congestion state in accordance with two different congestion levels on the basis of the wireless resource usage amount with reference to the wireless resource usage amount database;

(1) if a sector is determined to be in the light congestion state, the base station control block references the neighbor list database and the wireless resource usage amount database;

extracts a sector which specifies the congested sector as a neighbor sector and is not congested itself; and suppresses a soft hand-over from the extracted sector to the congested sector by reducing the neighbor search window size of the congested sector with respect to the data of the extracted sector in the neighbor list database; and (2) if a sector is determined to be in the heavy congestion state, the base station control block references the radio wave capture state database and the wireless resource usage amount database;

extracts a wireless terminal which specifies the congested sector as a neighbor sector and keeps capturing radio waves of a plurality of sectors for a predetermined period of time or longer and sectors serving the wireless terminal; and selects a sector having a relatively small wireless resource usage amount from the extracted sectors and causes a forced soft hand-over of the wireless terminal to the selected sector.

According to the present invention, congestion control can be performed without impairing the utilization efficiency of the system and the convenience of the user. According to the present invention, light congestion control can be performed without putting a strain on the wireless communication resources between the base stations. Heavy congestion control allows a stable soft hand-over because time-series data of radio wave capture state is used to select a mobile station to be subjected to a forced soft hand-over.

DESCRIPTION OF THE PREFERRED EMBODIMENTS

A preferred embodiment of the present invention will be described below with reference to the drawings.

A mobile station and a mobile communication system will now be described as an example, but the present invention can be applied to a variety of wireless terminals such as a PC and a PDA and a variety of wireless communication systems as well.

Figure 1:
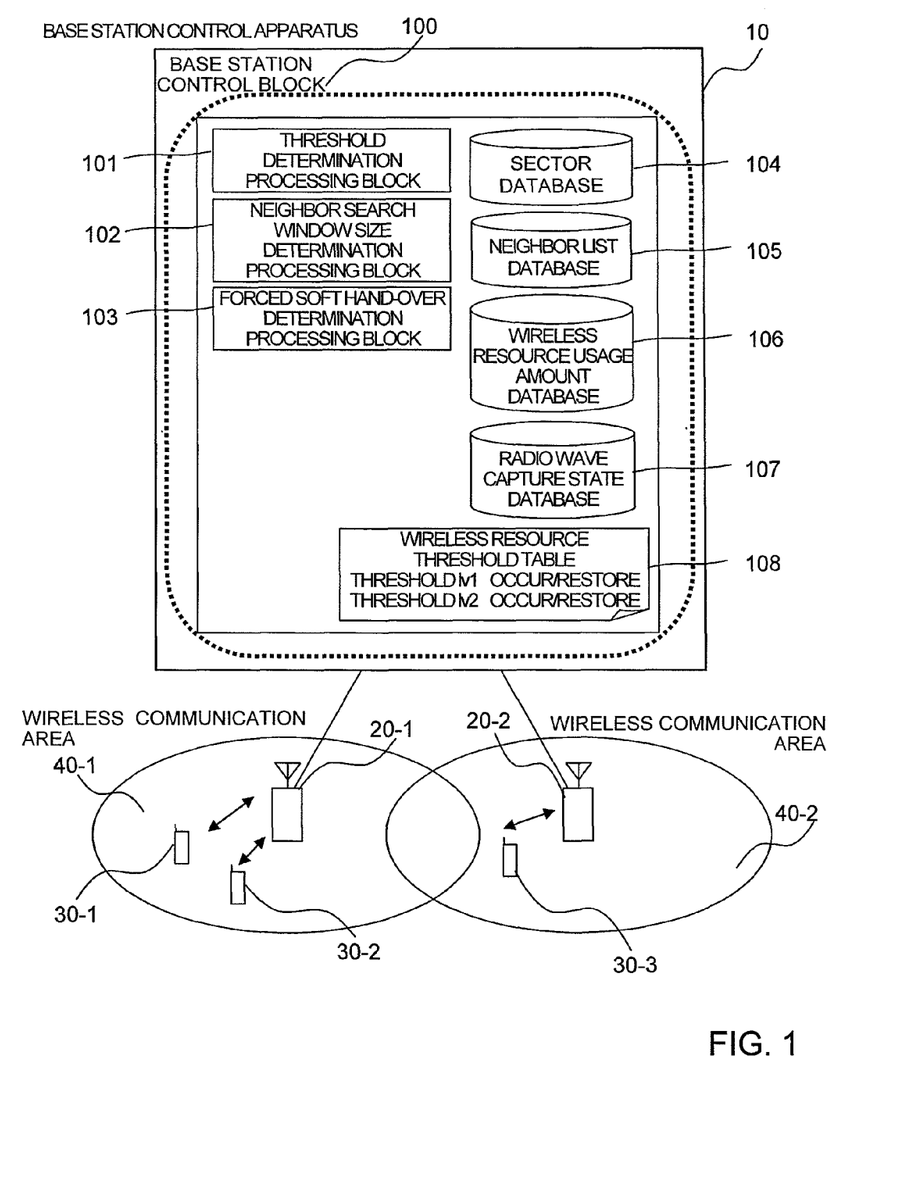
FIG. 1 is a block diagram showing the structure of a mobile communication network.

FIG. 1 is a block diagram showing the structure of a mobile communication network.

The mobile communication network of the present embodiment includes a plurality of base stations 20, a plurality of mobile stations 30, and a base station control apparatus 10 for controlling the base stations.

The base station 20 serves one or more sectors, which are wireless communication areas. Time-series data of the amount of wireless resource usage and the radio wave capture state of the mobile station is accumulated on a sector basis.

A base station control block 100 of the base station control apparatus 10 keeps a sector database (DB) 104 for performing collective management of configuration information of the sectors, a neighbor list database (DB) 105 for performing collective management of neighbor lists, a wireless resource usage amount database (DB) 106 for performing collective management of wireless resource usage amounts, a radio wave capture state database (DB) 107 for performing collective management of radio wave capture states, and a wireless resource threshold table 108 used for the judgment of congestion.

The base station control block 100 has also a threshold determination processing block 101 for determining a congested sector, a neighbor search window size determination processing block 102 for modifying a neighbor search window size, and a forced hand-over determination processing block 103 for determining a mobile station and a sector subjected to a forced soft hand-over.

A sample structure of each database (DB) will next be described.

Figure 6:
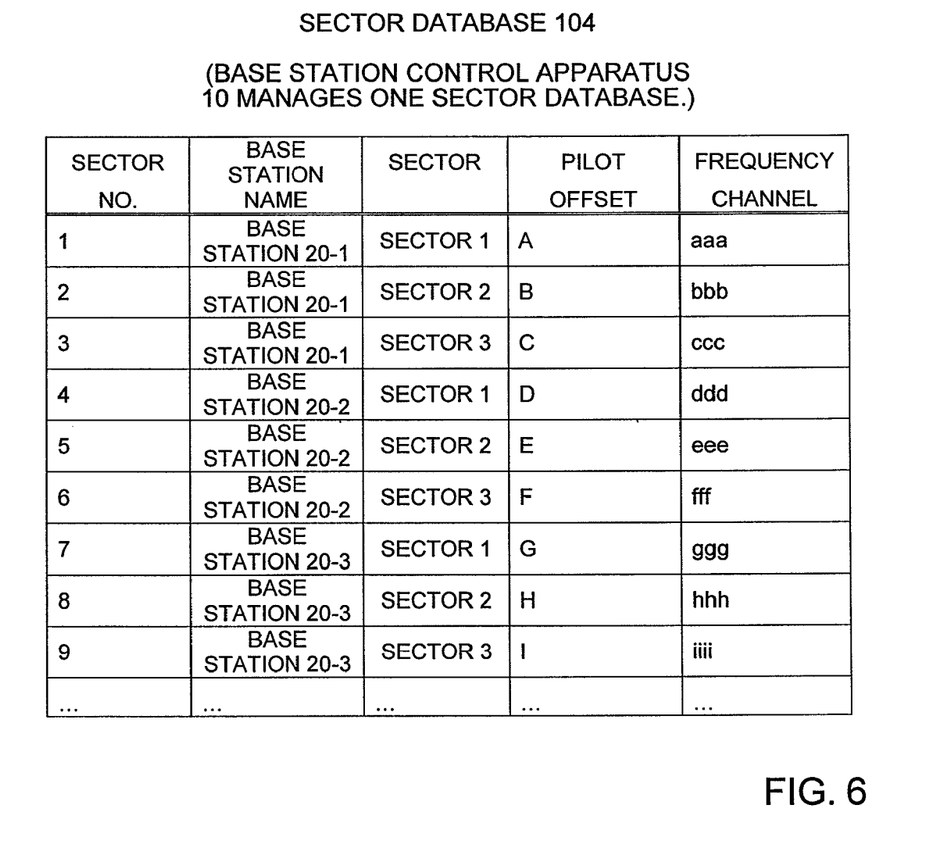
FIG. 6 is a view illustrating a sector database.

FIG. 6 is a view illustrating the sector database 104. The sector database 104 is a database related to all sectors of all base stations monitored by the base station control apparatus 10, and the base station control apparatus 10 manages one sector database 104.

In the "SECTOR NO." field, an index number in the database is stored. In the "BASE STATION NAME" and "SECTOR" fields of each SECTOR NO., the base station name and the sector number are stored. In the "PILOT OFFSET" field, a pilot offset value used in the sector is stored. In the "FREQUENCY CHANNEL" field, the frequency used in the sector is stored.

This database is updated when a base station is added or removed, when a sector is added or removed, when a station configuration is changed, or the like.

Figure 7:
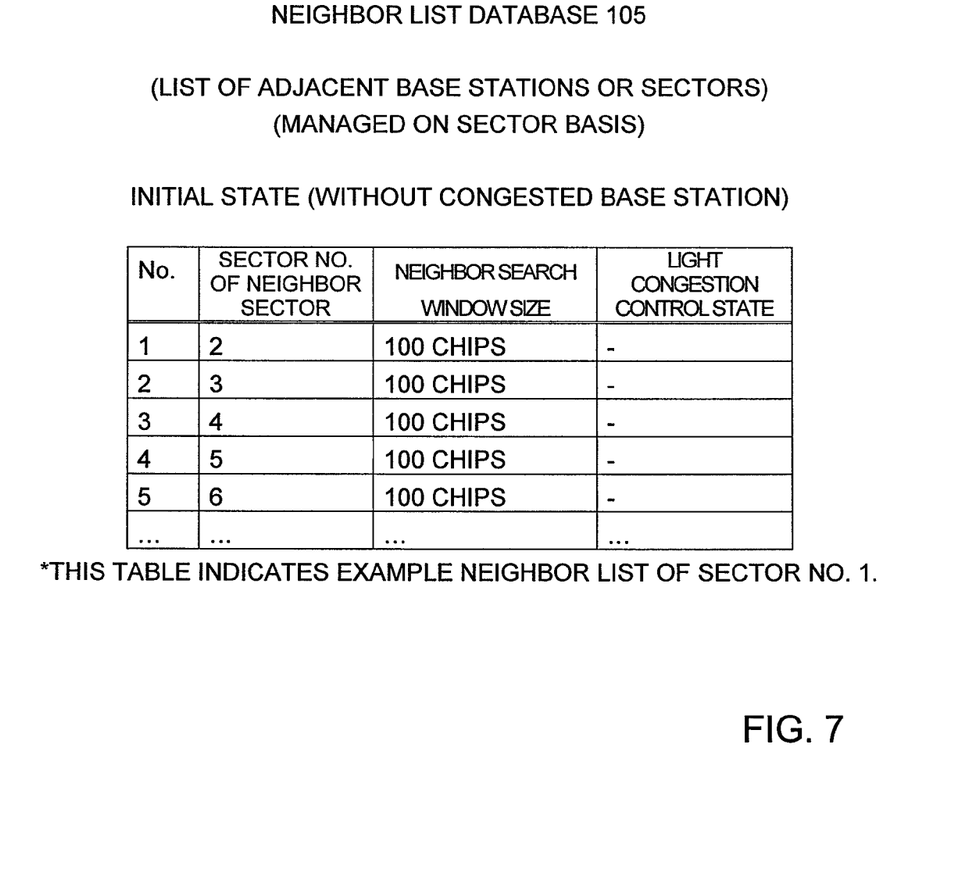
FIG. 7 is a view illustrating a neighbor list database when there is no congested base station.

FIG. 7 is a view illustrating the neighbor list database 105.

The neighbor list database 105 is a database storing information on neighbor hand-off sectors (or information on adjacent hand-off base stations) of each sector (or each base station). The base station and the mobile station hands off in accordance with the contents of this database.

The shown table is an example of a neighbor list of sector No. 1. In the "NO." field, an index number in the neighbor list database is stored. In the "SECTOR NO. OF NEIGHBOR SECTOR" field, the sector number of a neighbor sector is stored. In the "NEIGHBOR SEARCH WINDOW SIZE" field, the number of chips to be searched by the mobile station in the neighbor sector is stored. In the "LIGHT CONGESTION CONTROL STATE" field, "–" or "controlling" is specified to indicate whether light congestion control is executed. The initial state is "–", which indicates that light congestion control is not performed.

This database is updated when a base station is added or removed, when a sector is added or removed, when a station configuration is changed, when a neighbor sector is changed, or the like.

Figure 8:
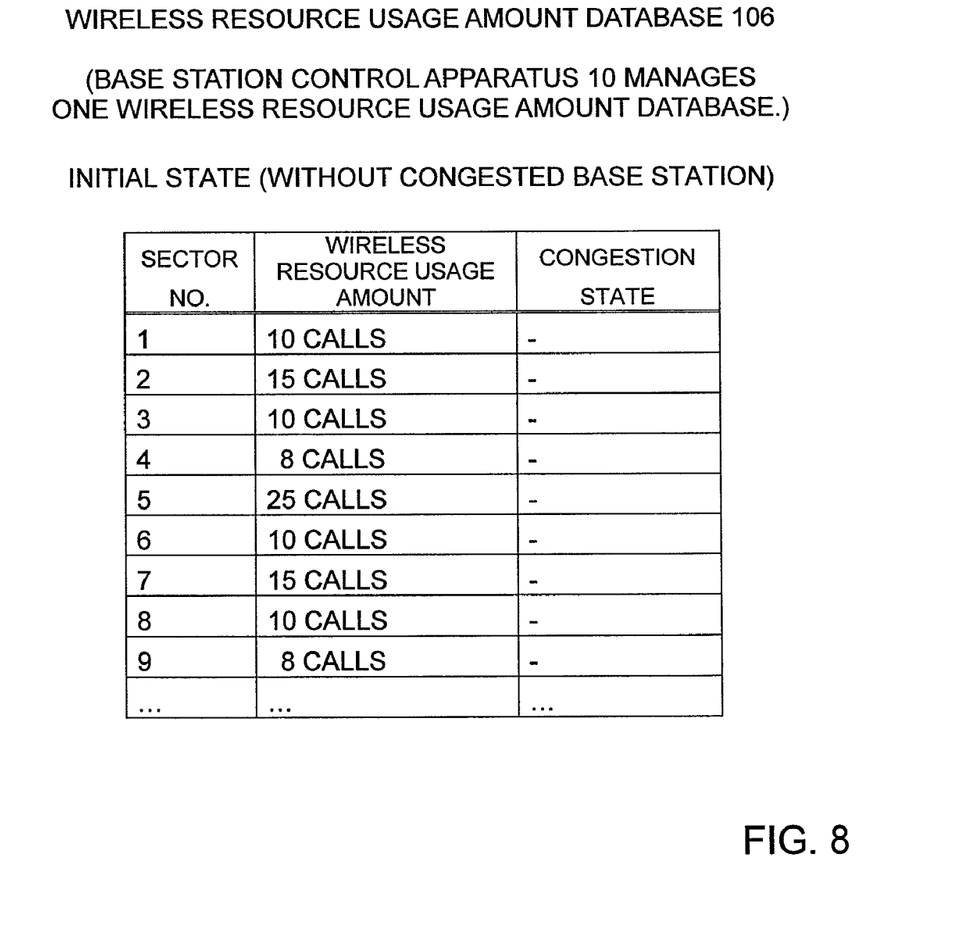
FIG. 8 is a view illustrating a wireless resource usage amount database when there is no congested base station.

FIG. 8 is a view illustrating the wireless resource usage amount database 106. The wireless resource usage amount database 106 is a database for managing the current wireless resource usage amount of each sector. Congestion control is performed in accordance with the wireless resource usage amount in this database.

In the "SECTOR NO." field, the sector No. in the sector database 104 is stored. In the "WIRELESS RESOURCE USAGE AMOUNT" field of each SECTOR NO., the wireless resource usage amount of the sector is stored. In the "CONGESTION STATE" field, "–", "light", or "heavy" is stored as a state of congestion. The initial state is "–", which indicates that there is no congestion.

This database is updated in accordance with the time-series data of the wireless resource usage amount received from the base station.

Figure 9:
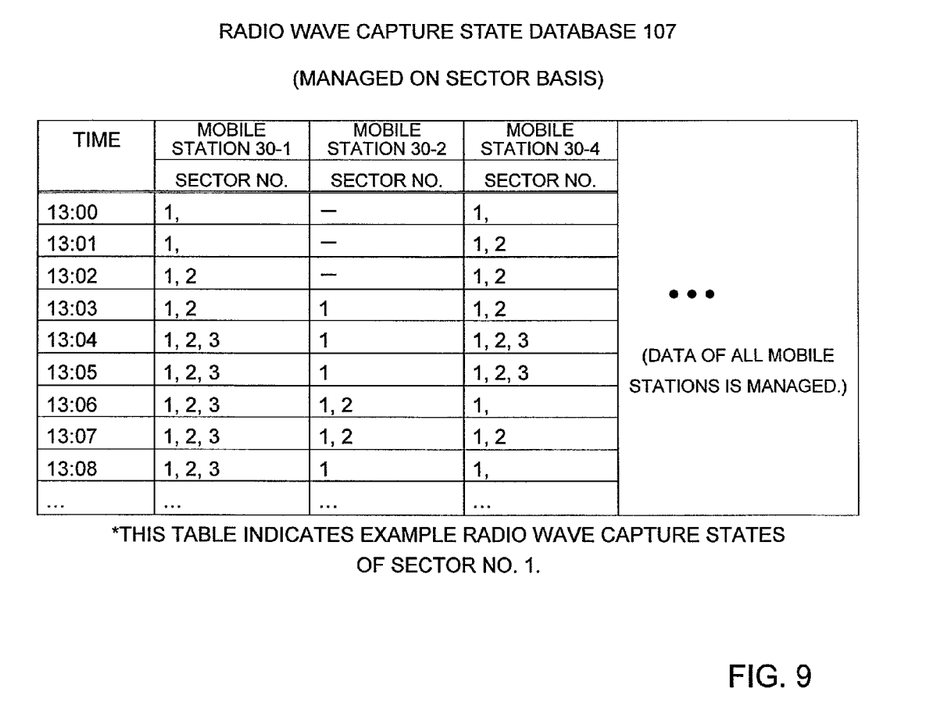
FIG. 9 is a view illustrating a radio wave capture state database.

FIG. 9 is a view illustrating the radio wave capture state database 107.

The radio wave capture state database 107 is managed on a sector basis and stores time-series data of radio waves captured by all the mobile stations communicating in the sector. Heavy congestion control is performed in accordance with the radio wave capture state in this database.

The table shows an example of radio wave capture states of sector No. 1. In the "SECTOR NO." field, the sector No. of a sector in which the mobile station is capturing radio waves is stored. The captured radio waves are radio waves recognized as "Active Set" or "Candidate Set", for instance (refer to 3GPP2 CS0024). The mobile station reports information on the captured radio waves to the base station, and the base station reports the information to the base station control apparatus 10.

This database is updated in accordance with the time-series data of the radio wave capture state of the mobile station, received from the base station.

FIG. 12 is a view illustrating the relationship between the search window size and the number of chips. In the CDMA mobile communication system, the search window size in which a mobile station attempts to capture radio waves is set to 4 to 452 chips, for instance (refer to 3GPP2 CS0024).

Figure 2:
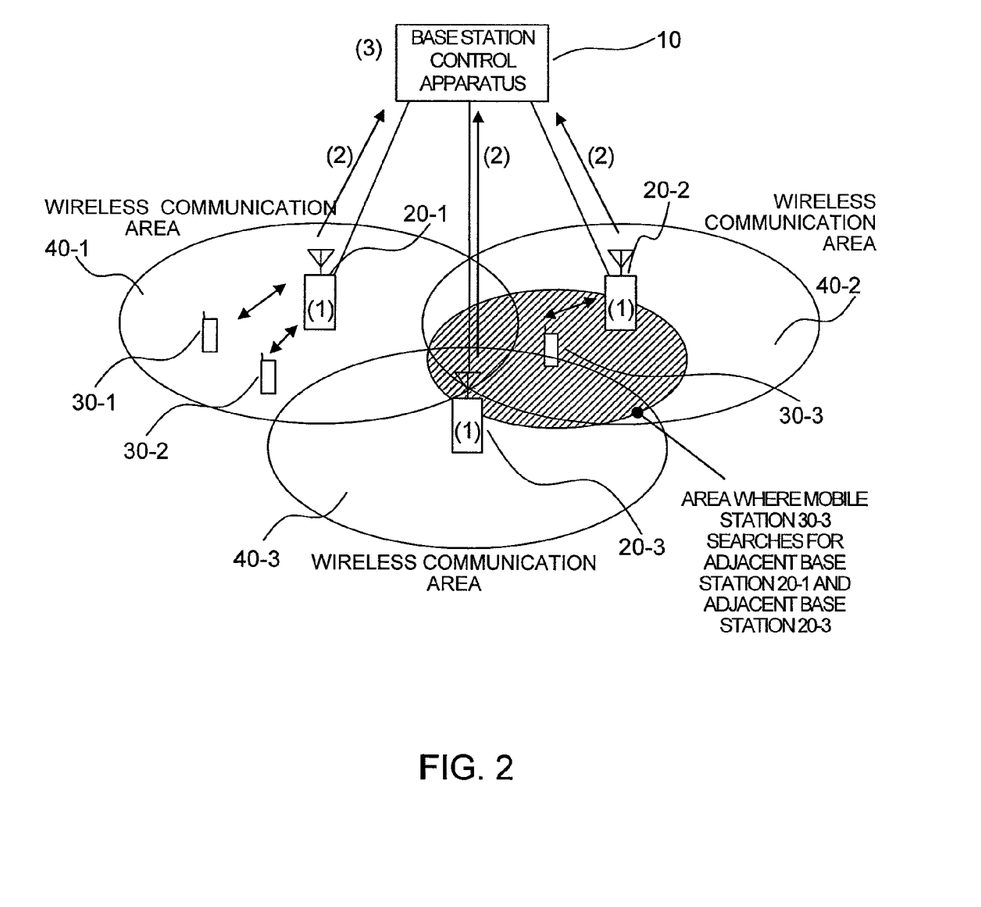
FIG. 2 is a view showing a method of collecting time-series data of a mobile station in a sector.

FIG. 2 is a view showing a method of collecting time-series data of a mobile station in a sector.

As shown in the figure, the base station 20 obtains the time-series data of the amount of wireless resource usage and the radio wave capture state of each mobile station 30 periodically in each sector (indicated by (1) in the figure) and reports the data to the base station control apparatus 10 (indicated by (2) in the figure). The reported time-series data is held in the wireless resource usage amount database 106 and the radio wave capture state database 107 in the base station control apparatus 10. The threshold determination processing block 101 in the base station control apparatus 10 compares the values in the wireless resource threshold table 108 specified beforehand on a sector basis and the wireless resource usage amount database 106 and determines a sector having the wireless resource usage amount exceeding a wireless resource threshold lv1 as being in the light congestion state and a sector having the wireless resource usage amount exceeding a wireless resource threshold lv2 as being in the heavy congestion state (indicated by (3) in the figure). As for the sector determined as not being in the congestion state, the threshold determination processing block 101 waits for the wireless resource usage amount reported from the base station in the next cycle.

Figure 3:
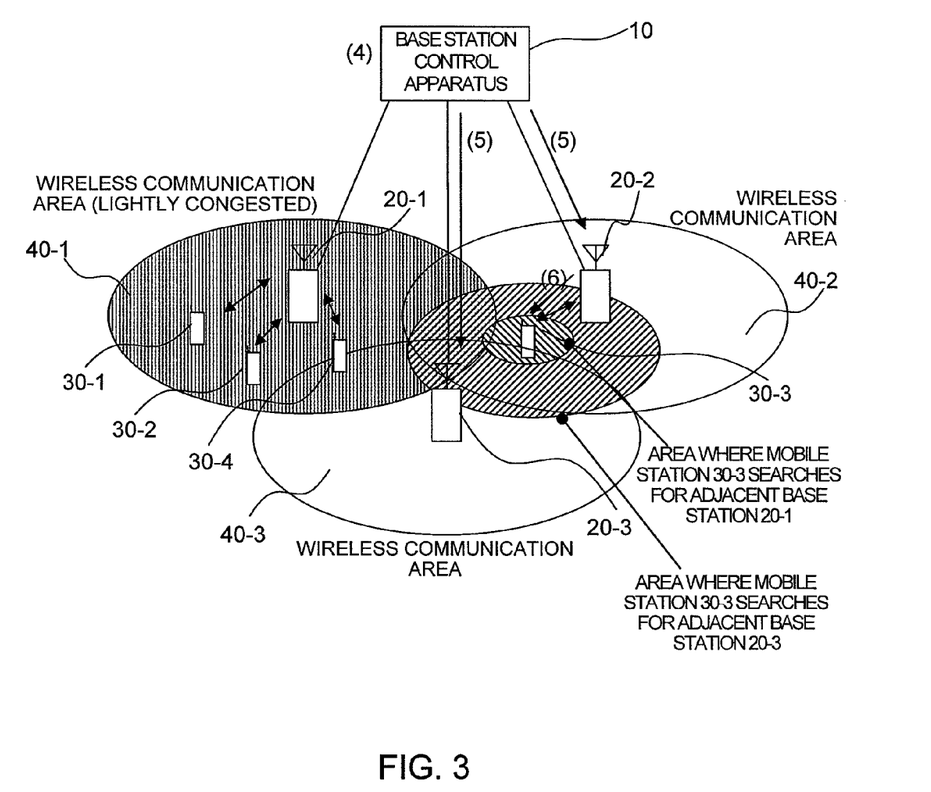
FIG. 3 is a view showing a congestion control method in a light congestion state.

FIG. 3 is a view showing a congestion control method in the light congestion state. The operation performed when the base station control apparatus 10 determines that the sector of the base station 20-1 is in the light congestion state will next be described. In this example, the base station 20-1 has a single sector, but the present invention can be applied to a multiple sector configuration as well.

The neighbor search window size determination processing block 102 in the base station control apparatus 10 extracts sectors that have specified the sector determined to be in the light congestion state as a neighbor sector from the neighbor list database 105. In the neighbor list database 105, the neighbor search window sizes in which the extracted sectors search for the lightly congested sector are reduced (indicated by (4) in the figure). The neighbor search window size determination processing block 102 reports the changed neighbor search window sizes to the base station 20-2 and the base station 20-3 (indicated by (5) in the figure).

The base station 20-2 and the base station 20-3 report the reported neighbor search window sizes to the mobile station 30-3 by a broadcast message (SectorParameters message) (indicated by (6) in the figure).

Since the mobile station 30-3 captures radio waves in accordance with the broadcast message (SectorParameters message), it does not capture radio waves of the lightly congested sector of the base station 20-1 of which the neighbor search window size has been reduced and captures only radio waves of the sector of the base station 20-2 or the base station 20-3. Consequently, no mobile station makes a soft hand-over to the lightly congested sector of the base station 20-1, and the wireless resource usage amounts among the sectors of the base station 20-1, the base station 20-2, and the base station 20-3 are leveled off. In this stage, just a soft hand-over to the lightly congested sector is restricted, and the mobile station 30-4 can originate a call into the lightly congested sector of the base station 20-1. Accordingly, the wireless resource utilization efficiency of the entire system or the convenience of the user is not reduced.

If the wireless resource usage amount of the lightly congested sector falls below the restoration threshold lv1, the reduced neighbor search window sizes are returned to the values before the reduction.

Figure 4:
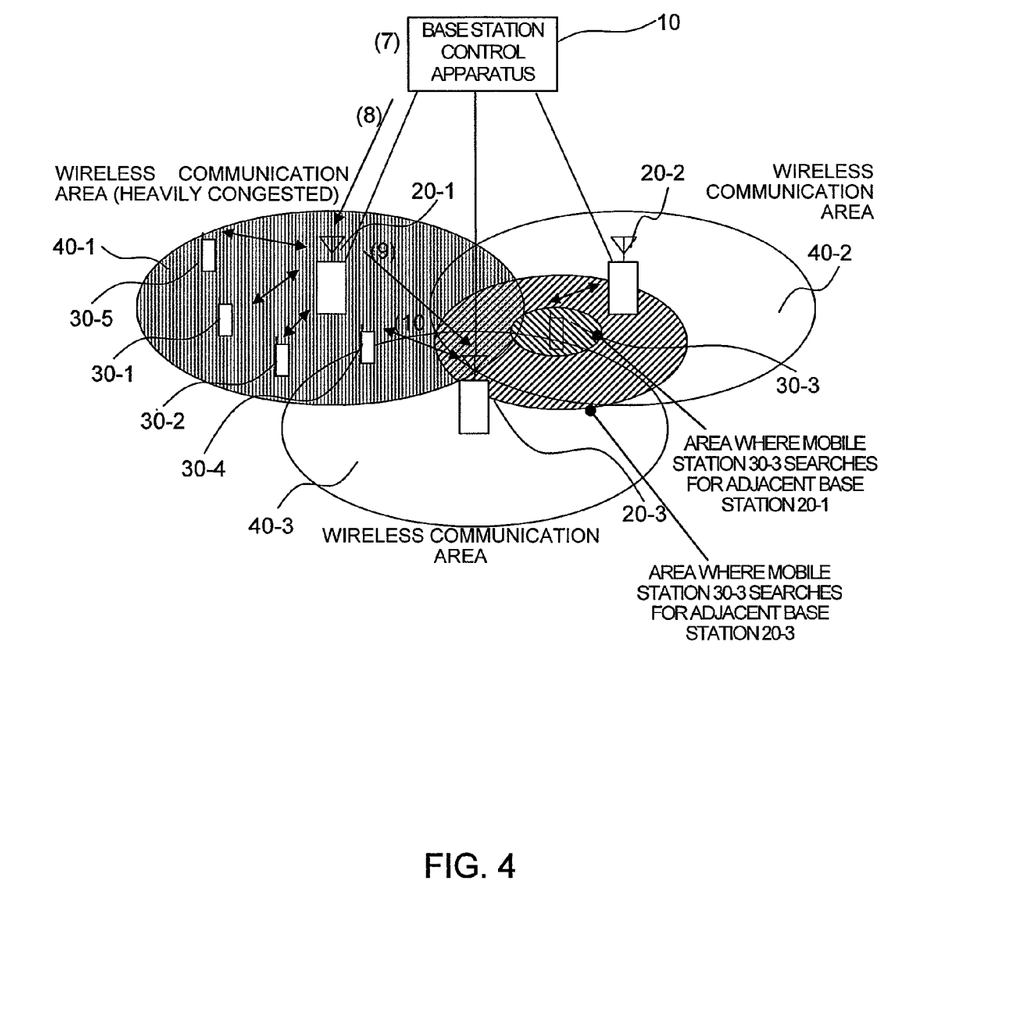
FIG. 4 is a view showing a congestion control method in a heavy congestion state.

FIG. 4 is a view showing a congestion control method in the heavy congestion state. The operation performed when the base station control apparatus 10 determines the sector of the base station 20-1 as being in the heavy congestion state will next be described.

The forced soft hand-over determination processing block 103 in the base station control apparatus 10 extracts a mobile station which is communicating with a heavily congested sector and is kept in a two-way or three-way state and a sector in which the mobile station captures radio waves, from the radio wave capture state database 107 (indicated by (7) in the figure). The forced soft hand-over determination processing block 103 makes a forced soft hand-over to an extracted sector which is not in the light congestion state nor in the heavy congestion state (indicated by (8) and (9) in the figure). If there are a plurality of sectors to which a soft hand-over can be made, the forced soft hand-over determination processing block 103 references the wireless resource usage amount database 106 and determines the sector having the smallest wireless resource usage amount as the destination of soft hand-over.

In the example shown in FIG. 9, the mobile station 30-1 continually receives radio waves of sectors No. 1 and No. 2. FIG. 8 shows that sector No. 1 has a smaller wireless resource usage amount than sector No. 2. Therefore, sector No. 1 becomes the destination of the forced soft hand-over.

Now, the mobile station 30-4 starts communication with the base station 20-3 in its sector without congestion (indicated by (10) in the figure).

The threshold determination processing block 101 in the base station control apparatus 10 repeats the steps of (7), (8), (9), and (10) until the heavy congestion state is released.

Figure 5:
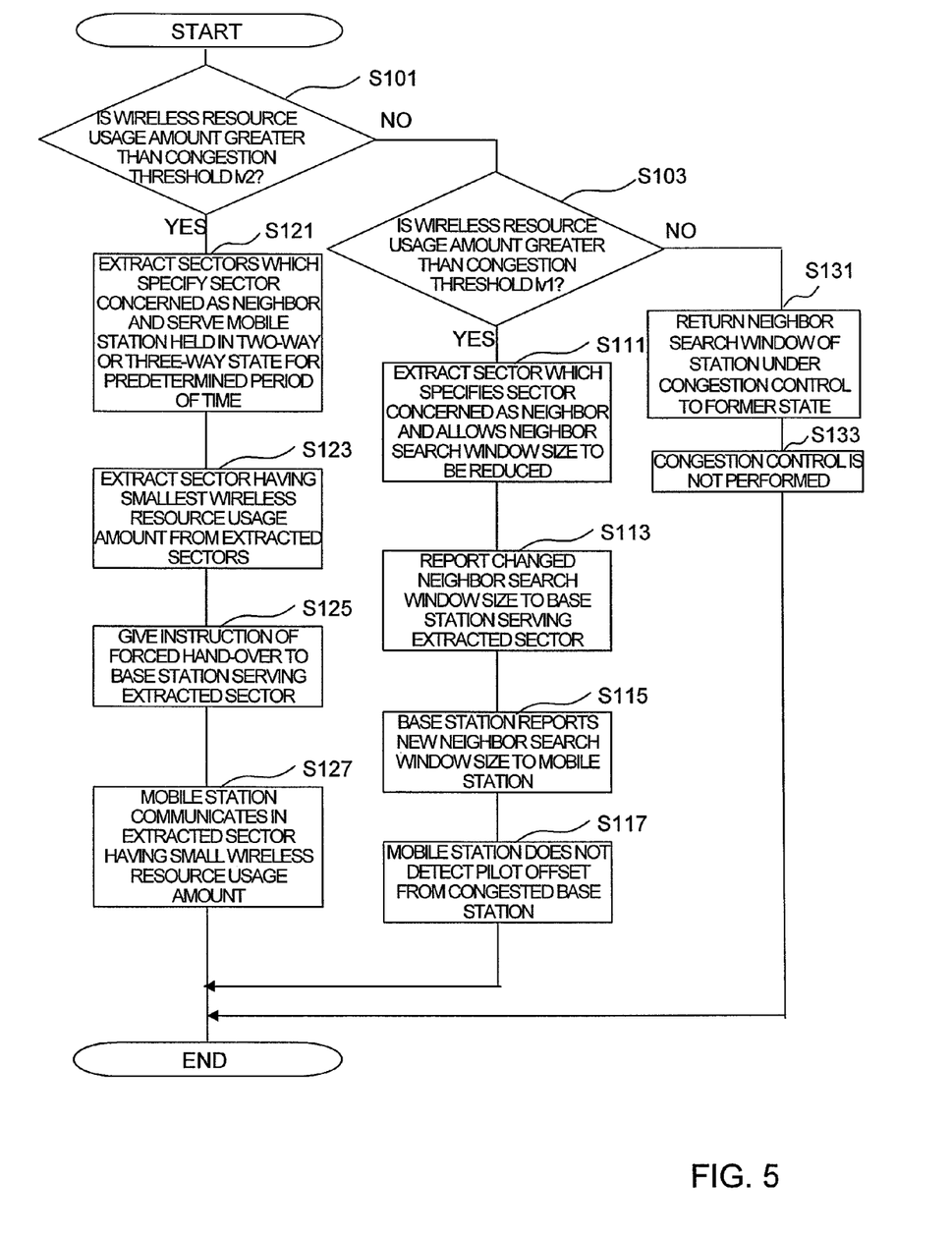
FIG. 5 is a flow chart of the congestion control method.

FIG. 5 is a flow chart of the congestion control method. The operation of the embodiment, which has been described above (with reference to FIGS. 2, 3, and 4), will be described with reference to the flow chart.

Figure 10:
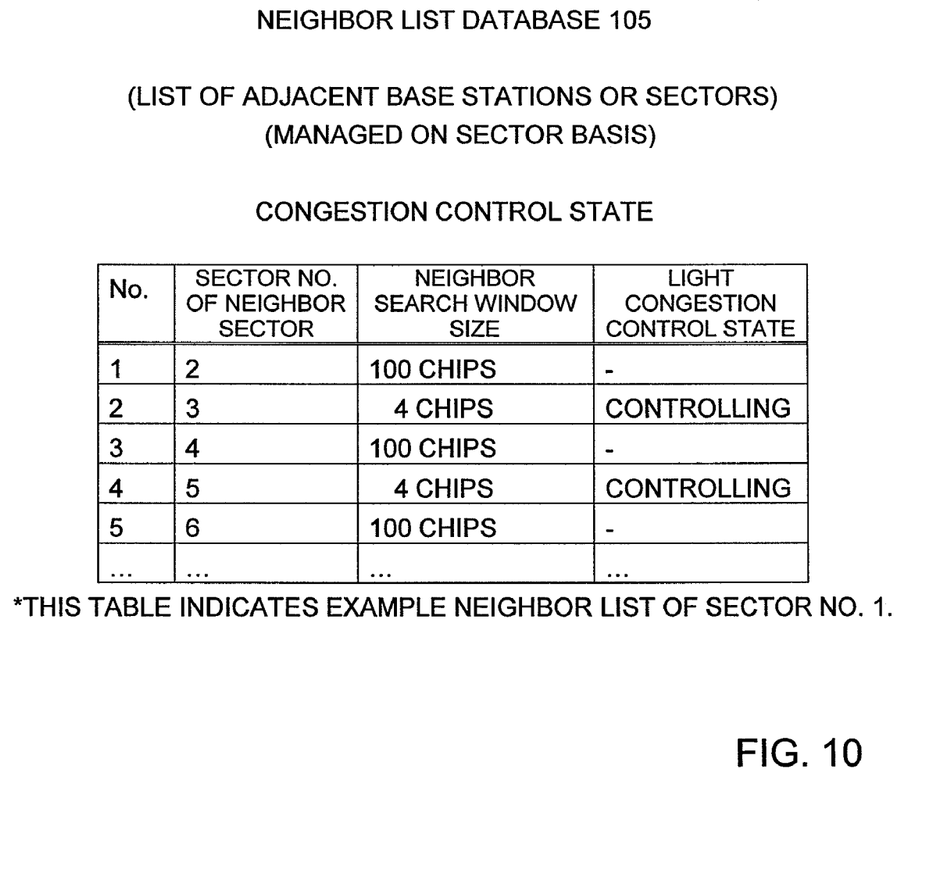
FIG. 10 is a view illustrating the neighbor list database when there is a congested base station.

FIG. 10 is a view illustrating the neighbor list database 105 while congestion control is in progress.

FIG. 7 shows the initial state, and FIG. 10 shows that sector No. 3 and sector No. 5 have entered the congestion state, and their neighbor search window size has been changed from 100 chips to 4 chips.

Figure 11:
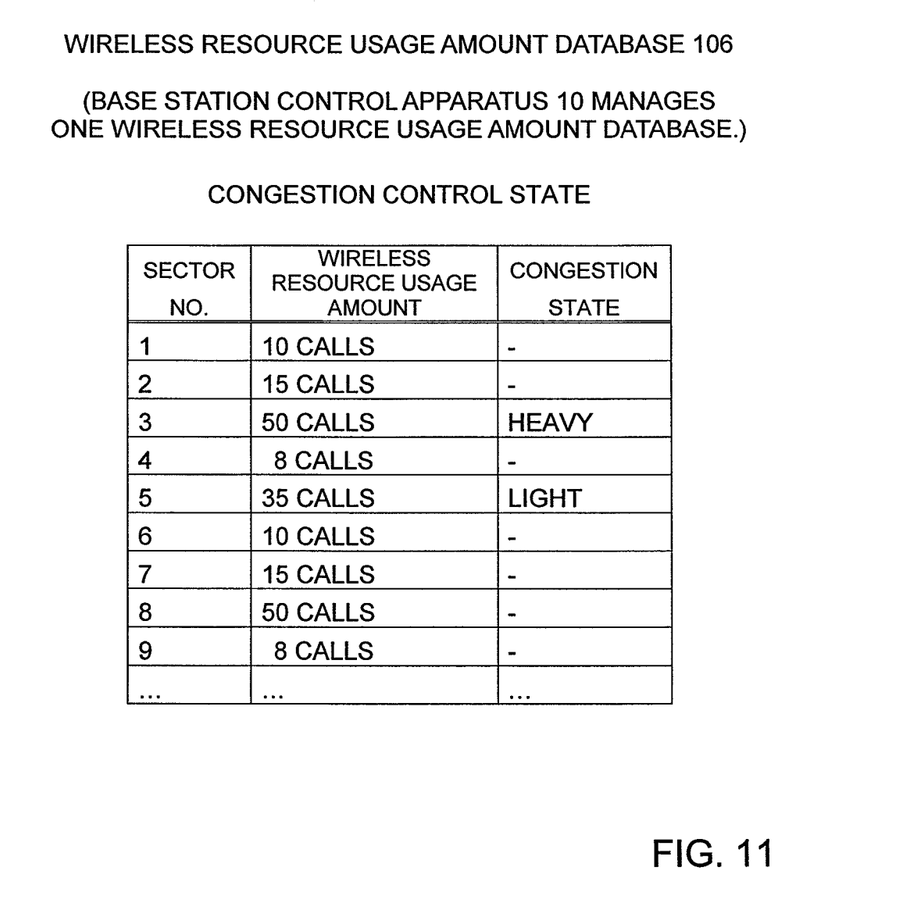
FIG. 11 is a view illustrating the wireless resource usage amount database when there is a congested base station.

FIG. 11 is a view illustrating the wireless resource usage amount database 106 while congestion control is in progress.

FIG. 8 shows the initial state, and FIG. 11 shows that the wireless resource usage amounts of sector No. 3 and sector No. 5 have increased to bring sector No. 3 into the heavy congestion state and sector No. 5 into the light congestion state.

It is supposed here as a sample case that the initial states of the sector database 104, the neighbor list database 105, the wireless resource usage amount database 106, and the radio wave capture state database 107 are as shown in FIG. 6, FIG. 7, FIG. 11, and FIG. 9, respectively.

The threshold determination processing block 101 of the base station control block 100 references the wireless resource threshold table 108 and the wireless resource usage amount database 106 (FIG. 11) for each sector and determines whether the sector is in the light congestion state, is in the heavy congestion state, or is not in the congestion state. In accordance with the determined state (in steps S101 and/or S103), subsequent processes are performed.

In the Light Congestion State

The operation performed when the sector is determined to be in the light congestion state in steps S101 and S103 will next be described.

The neighbor search window size determination processing block 102 extracts sectors specifying the lightly congested sector as a neighbor sector, from the neighbor list database 105 (FIG. 7). From the extracted sectors, a non-congestion sector having the wireless resource usage amount not exceeding a predetermined threshold (sectors of which the neighbor search window size can be reduced) is extracted, with reference to the wireless resource usage amount database 106 (FIG. 11) (in step S111). In the neighbor list database 105 (FIG. 10) for the extracted sector, the lightly congested sector is searched for, and the corresponding "neighbor search window size" and "congestion control state" are updated (in step S113). For example, the data of sector No. 1 is updated from that shown in FIG. 7 to that shown in FIG. 10. More specifically, the "neighbor search window sizes" of neighbor sectors No. 3 and No. 5 are changed from 100 chips to 4 chips, and the "congestion control states" thereof are changed to "controlling". With reference to the sector database 104, the base station control apparatus 10 reports the updated neighbor search window sizes to the base station serving the sector for which the neighbor list database 105 has been updated (in step S115).

The base station receives the report and reports the updated neighbor search window size to each mobile station under it (in step S117). The mobile station captures radio waves in accordance with the reported neighbor search window size and will not detect radio waves (pilot offset) in the lightly congested sector.

In the light congestion state, a soft hand-over from a neighbor sector to the congested sector is suppressed, communication can be performed with a sector having wireless resources available, and mobile-station-led congestion control can be performed without using wireless resources exchanged between the base stations.

In the Heavy Congestion State

The operation performed when the sector is determined to be in the heavy congestion state in step S101 will next be described. The neighbor list database 105 is supposed to be in the state shown in FIG. 10.

The forced soft hand-over determination processing block 103 extracts mobile stations which are in sectors adjacent to the heavily congested sector, with reference to the wireless resource usage amount database 106 (FIG. 11) and the neighbor list database 105 (FIG. 10), and are in a two-way state, three-way state, or another multiple-way state for a certain period of time, with reference to the radio wave capture state database 107 (FIG. 9), and extracts sectors serving the mobile stations (in step S121). In the example shown in FIG. 9, if sector No. 1 is in the heavy congestion state, sectors No. 2 and No. 3 can be a destination of forced hand-over because the mobile station 30-1 captures radio waves of those sectors as well as sector No. 1 continuously (for a predetermined period of time or longer).

The forced hand-over determination processing block 103 then extracts the sector having the smallest wireless resource usage amount from the sectors extracted in step S121, with reference to the wireless resource usage amount database 106 (FIG. 11). In the example shown in FIG. 11, among the sectors that can be a destination of forced hand-over, sector No. 2 is not congested, and sector No. 3 is congested. Therefore, sector No. 2 is selected as a destination of forced hand-over of the mobile station 30-1 (in step S123). With reference to the sector database 104, the base station control apparatus 10 gives a direction of forced hand-over of the extracted mobile station (mobile station 30-1 in this example) to the base station serving the extracted sector and mobile station (in step S125).

The extracted mobile station (mobile station 30-1 in this example) continues communication through a hand-over to the extracted sector with a smaller wireless resource usage amount (in step S127).

The wireless resource usage amount of the heavily congested sector is reduced as described above, so that a new call can be connected.

In the Non-Congestion State

The operation performed when no congestion is found in steps S101 and S103 will next be described.

With reference to the neighbor list database 105, the neighbor search window size determination processing block 102 restores the original neighbor list of which the neighbor search window size was changed in the previous cycle. The base station control apparatus 10 reports the restored neighbor search window size to the base station, and the base station reports it to the mobile station (in step S131). For example, the neighbor list database 105 is returned from the state shown in FIG. 10 to the state shown in FIG. 7. The base station control block 100 does not perform congestion control with respect to the sector in the non-congestion state (in step S133).

The flow control described above is performed periodically on a sector basis.

If a sector of a base station is congested, the wireless resource of a neighbor sector having no congestion is effectively used on the basis of the collective management data, so that the usage rate of the wireless resources in the entire system can be improved.

The present invention can be applied to a wide range of wireless terminals and wireless communication systems.

What is claimed is:

1. A congestion control method for a wireless communication system having a plurality of base stations for performing code division multiple access (CDMA) wireless communication and a base station control apparatus for controlling the plurality of base stations, the congestion control method comprising the steps of:
   the base station control apparatus determining whether a sector is in a light congestion state or a heavy congestion state in accordance with at least two different congestion levels, with reference to a wireless resource usage amount data base having stored a wireless resource usage amount for each sector, based on the wireless resource usage amount;
   (1) if a sector is determined to be in the light congestion state, the base station control apparatus referencing a neighbor list database having stored, on a sector basis, a neighbor sector and a neighbor search window size indicating the size of an area or the number of chips by which a wireless terminal searches for the neighbor sector, and the wireless resource usage amount database;

extracting a sector which has specified the congested sector as a neighbor sector and is not congested itself; and reducing the neighbor search window size of the congested sector with respect to the data of the extracted sector in the neighbor list database to suppress a soft hand-over from the extracted sector to the congested sector; and (2) if a sector is determined to be in the heavy congestion state, the base station control apparatus referencing a radio wave capture state database having stored time-series data of a radio wave capture state of each wireless terminal on a sector basis and the wireless resource usage amount database;

extracting a wireless terminal which specifies the congested sector as a neighbor sector and keeps capturing radio waves of a plurality of sectors for a predetermined period of time or longer and sectors serving the wireless terminal; and selecting a sector having a relatively small wireless resource usage amount, from the extracted sectors, and causing forced soft hand-over of the wireless terminal to the selected sector.

2. A congestion control method for a wireless communication system according to claim 1, wherein the plurality of base stations report the wireless resource usage amount for each sector and time-series data of the radio wave capture state of the wireless terminal, to the base station control apparatus; and the base station control apparatus updates the wireless resource usage amount database and the radio wave capture state database in accordance with the reported information.

3. A congestion control method for a wireless communication system according to claim 1, wherein the base station control apparatus reports an updated neighbor search window size to a base station serving a sector for which the neighbor search window size has been updated in the neighbor list database; and the base station reports the updated neighbor search window size to each wireless terminal under it.

4. A congestion control method for a wireless communication system according to claim 1, wherein the base station control apparatus gives an instruction of forced hand-over to the base station serving the extracted sector and the wireless terminal.

5. A congestion control method for a wireless communication system according to claim 1, wherein the base station control apparatus returns the neighbor search window size to the former size when the wireless resource usage amount becomes lower than a light congestion state restoration threshold.

6. A congestion control method for a wireless communication system according to claim 1, wherein the base station control apparatus suppresses the forced soft hand-over control when the wireless resource usage amount becomes lower than a heavy congestion state restoration threshold.

7. A base station control apparatus for controlling a plurality of base stations that perform code division multiple access (CDMA) wireless communication, the base station control apparatus comprising:

a wireless resource usage amount database which has stored a wireless resource usage amount for each sector;

a neighbor list database which has stored, on a sector basis, a neighbor sector and a neighbor search window size indicating the size of an area or the number of chips by which a wireless terminal searches for the neighbor sector;

a radio wave capture state database which has stored time-series data of a radio wave capture state of each wireless terminal on a sector basis; and a base station control block for determining a congested sector, changing the neighbor search window size, and determining a wireless terminal and/or a sector to be the target of a forced soft hand-over;

wherein the base station control block determines whether a sector is in the light or heavy congestion state in accordance with two different congestion levels on the basis of the wireless resource usage amount with reference to the wireless resource usage amount database;

(1) if a sector is determined to be in the light congestion state, the base station control block references the neighbor list database and the wireless resource usage amount database;

extracts a sector which specifies the congested sector as a neighbor sector and is not congested itself; and suppresses a soft hand-over from the extracted sector to the congested sector by reducing the neighbor search window size of the congested sector with respect to the data of the extracted sector in the neighbor list database; and (2) if a sector is determined to be in the heavy congestion state, the base station control block references the radio wave capture state database and the wireless resource usage amount database;

extracts a wireless terminal which specifies the congested sector as a neighbor sector and keeps capturing radio waves of a plurality of sectors for a predetermined period of time or longer and sectors serving the wireless terminal; and selects a sector having a relatively small wireless resource usage amount from the extracted sectors and causes a forced soft hand-over of the wireless terminal to the selected sector.

8. A base station control apparatus according to claim 7, wherein the base station control apparatus updates the wireless resource usage amount database and the radio wave capture state database in accordance with the wireless resource usage amount for each sector and the time-series data of the radio wave capture state of the wireless terminal, reported from the plurality of base stations.

9. A base station control apparatus according to claim 7, wherein the base station control apparatus reports an updated neighbor search window size to a base station serving a sector for which the neighbor search window size has been updated in the neighbor list database.

10. A base station control apparatus according to claim 7, wherein the base station control apparatus gives an instruction of forced hand-over to the base station serving the extracted sector and the wireless terminal.

* * * * *